United States Patent [19]

Aoyama et al.

[11] Patent Number: 5,754,382
[45] Date of Patent: May 19, 1998

[54] GAS INSULATED SWITCHGEAR AND POWER TRANSMISSION SYSTEM USING THE SWITCHGEAR

[75] Inventors: Takanobu Aoyama, Hitachi; Tadasuke Yamamoto, Juuou-machi, both of Japan

[73] Assignee: Hitachi, Ltd., Tokyo, Japan

[21] Appl. No.: 699,390

[22] Filed: Aug. 19, 1996

[30] Foreign Application Priority Data

Aug. 30, 1995 [JP] Japan ................. 7-221399

[51] Int. Cl.$^6$ ........................................ H02H 3/00
[52] U.S. Cl. ................. 361/62; 361/107; 361/618; 307/85
[58] Field of Search ............... 361/62, 63, 107–108, 361/93, 604–605, 612, 618–619; 307/64, 66, 85

[56] References Cited

U.S. PATENT DOCUMENTS

| | | | |
|---|---|---|---|
| 4,752,860 | 6/1988 | Romanet et al. | 361/602 |
| 4,862,319 | 8/1989 | Suzuyama et al. | 361/612 |
| 4,933,802 | 6/1990 | Haginoya et al. | 361/48 |
| 5,045,968 | 9/1991 | Suzuyama et al. | 361/618 |
| 5,581,439 | 12/1996 | Hachida et al. | 361/612 |
| 5,590,018 | 12/1996 | Watahiki et al. | 361/612 |

FOREIGN PATENT DOCUMENTS 5-103494  4/1993  Japan.
5-122813  5/1993  Japan.

*Primary Examiner*—Jeffrey A. Gaffin
*Assistant Examiner*—Michael J. Sherry
*Attorney, Agent, or Firm*—Fay, Sharpe, Beall, Fagan, Minnich & McKee

[57] ABSTRACT

A power transmission system includes a transmission line unit for three phases connected to three gas insulated transmission lines and a standby transmission line unit for a phase connected to a standby gas insulated transmission line connected with each other. A connection bus is provided at a branch part of each breaker in the transmission line unit for three phases, via the breaker. The connection bus is connected to a branch bus provided between the breaker in the transmission line unit of a gas insulated switch gear for three phases and the main buses, and to the standby transmission line unit.

9 Claims, 10 Drawing Sheets

1P,2P,3P : 1st PHASE, 2nd PHASE, 3rd PHASE, 1P, 2P, 3P : 1st PHASE, 2nd PHASE, 3rd PHASE, 1P,2P,3P : 1st PHASE, 2nd PHASE, 3rd PHASE,

GAS INSULATED SWITCHGEAR AND POWER TRANSMISSION SYSTEM USING THE SWITCHGEAR

BACKGROUND OF THE INVENTION

1. Field of the Invention

The present invention relates to a power transmission system comprising power transmission lines, and a gas insulated switchgear, installed in a substation or a switching station, composed of buses and breakers, each of which is contained in a metal container filled with insulation gas, and particularly to a power transmission system comprising a transmission channel of gas insulated power transmission lines for three phases, and a standby gas insulated power transmission line for one phase, and a gas insulated switchgear, for a substation or a switching station.

2. Description of Related Art

Recently, obtaining a site for a substation or a switching station has been difficult, and cases of using a gas insulated switchgear requiring only a small installation area have increased. Further, cases of using a gas insulated switch gear have increased as a countermeasure to damage caused by salt in coastal areas, or to improve the reliability of a substation and a switching station in areas having much snow.

Further, transmission capacity is also increasing, due to the recent increase of plant capacity. Furthermore, many steel towers are needed, making the construction of transmission lines difficult, if constructed by the overhead transmission line method. As a result, the need for an underground transmission line method is strengthened. As a countermeasure to the above-mentioned problems, a cable transmission method or a gas insulated transmission line method is available. In the case of large capacity transmission, since the cable transmission method needs many cables for a phase, the gas insulated transmission line method which needs one line for a phase, is superior in economic terms and in efficiency for construction or maintenance.

In the existing transmission line system, two channels of transmission lines are prepared to assure keeping power transmission even if a failure occurs in a transmission line. Thus, for the single phase type gas insulated bus, at least six transmission cables or lines are provided for six phases.

Although a transmission line system having a standby transmission channel for single phase is disclosed in JPA-103404/1993 and JP-A-122813/1993, two channels of transmission lines for three phase are still installed besides the standby channel in each of the transmission line systems.

FIG. 8 shows an example of a triple line connection diagram for the gas insulated transmission lines and the gas insulated switchgears.

As shown in FIG. 8, in an A substation, a duplex bus structure composed of an A bus and a B bus is adopted, and disconnectors 5-1 for the A bus and 6-1 for the B bus are connected to the A bus and the B bus, respectively. Two lines for a phase are combined after each pair of disconnectors 5-1 and 6-1, and connected to each of breakers 4-1, each of disconnectors 3-1 for a transmission line and one of transmission lines 1, in order. Further, each of the transmission lines 1 is connected to an opposite side B substation. The transmission lines are the gas insulated transmission lines which are provided with two channels of six lines, that is, a channel 1 of lines 1A, 1B and 1C, and a channel 2 of lines 2A, 2B and 2C.

Arrangement of components corresponding to the triple line connection diagram shown in FIG. 8 is shown in FIG. 9 and FIG. 10.

As shown in FIG. 10, three phase common enclosed main buses 7-1 and 7-2 are arranged near the ground, and the disconnectors 5-1 for the A bus and 6-1 for the B bus are provided over the main buses 7-1 and 7-2. The two lines for each phase are connected to each other after the disconnectors 5-1 and 6-1, at a branch bus located in the side opposite the gas insulated transmission lines 1, and connected to a corresponding one of the breakers 4-1, a corresponding one of the disconnectors 3-1 at the transmission line side via the upper part of the above-mentioned corresponding one of the breakers 4-1, and a corresponding one of the gas insulated transmission lines 1, in order. The connecting composition of the components is the same for six phases.

Although one standby channel of the gas insulated transmission lines for three phases is provided, since the standby channel is not used in the normal operation state, the six gas insulated transmission lines are not validly utilized.

SUMMARY OF THE INVENTION

Objectives of the Invention

One objective of the present invention is to provide such a gas insulated switchgear (referred to as GIS) and a power transmission system using the GIS whereby the laying area necessary for transmission lines is smaller, and the reliability of power transmission is improved, in comparison with existing transmission lines.

Another objective of the present invention is to provide such a gas insulated switchgear and a power transmission system using the GIS whereby the number of the transmission lines is decreased, and the transmission lines are quickly recovered on occurrence of a failure in the operating transmission lines.

Methods Solving the Problem

In order to attain the above-mentioned objectives, the present invention provides a power transmission system having gas insulated transmission lines for connecting two stations of substations/switching stations, and gas insulated switchgears installed in the two stations and connected to the gas insulated transmission lines.

The power transmission system includes a channel of gas insulated transmission lines for three phases, a standby channel of a gas insulated transmission line for one phase, a transmission line unit in a gas switchgear including three sets of breakers and disconnectors for three phases, provided for the channel of gas insulated transmission line for three phases. Three lines for three phases are branched from the channel of gas insulated transmission lines for three phases, by using a branch bus, and combined into one line and connected to the standby channel.

Furthermore, the above power transmission system, further includes protection relays provided at the channel of gas insulated transmission lines for three phases, wherein the opening operation of a breaker, corresponding to a failed phase in the channel, in the transmission line unit of the channel of gas insulated lines for three phases, is controlled, based on a failure detection signal of the failed phase, sent from one of the protection relays. The closing operation of a breaker, corresponding to the failed phase, in the transmission line unit of the standby channel of a gas insulated transmission line, is also controlled, based on the failure detection signal of the failed phase, sent from the one of the protection relays.

3

In order to attain the above-mentioned objectives, the present invention provides a gas insulated switchgear installed in each of substations/switching stations and connected to gas insulated transmission lines for connecting two stations of the substations/the switching stations.

The gas insulated switchgear includes a first transmission line unit including three sets, each set including one breaker and disconnectors, for three phases, provided in a channel of gas insulated transmission lines for three phases.

A second transmission line unit including three sets, each set including one breaker and disconnector, for three phases, is provided in a standby channel of a gas insulated transmission line for a phase. The first and second transmission line units are connected to each other by using a branch bus. A transmission line corresponding to a failed phase in the channel of gas insulation lines for three phases is switched to the channel of a gas insulated transmission line for a phase via the second transmission line unit in each of the two stations.

DETAILED DESCRIPTION OF THE EMBODIMENTS

Hereinafter, details of the present invention will be explained with reference to embodiments shown in FIGS. 1–3.

Figure 1:
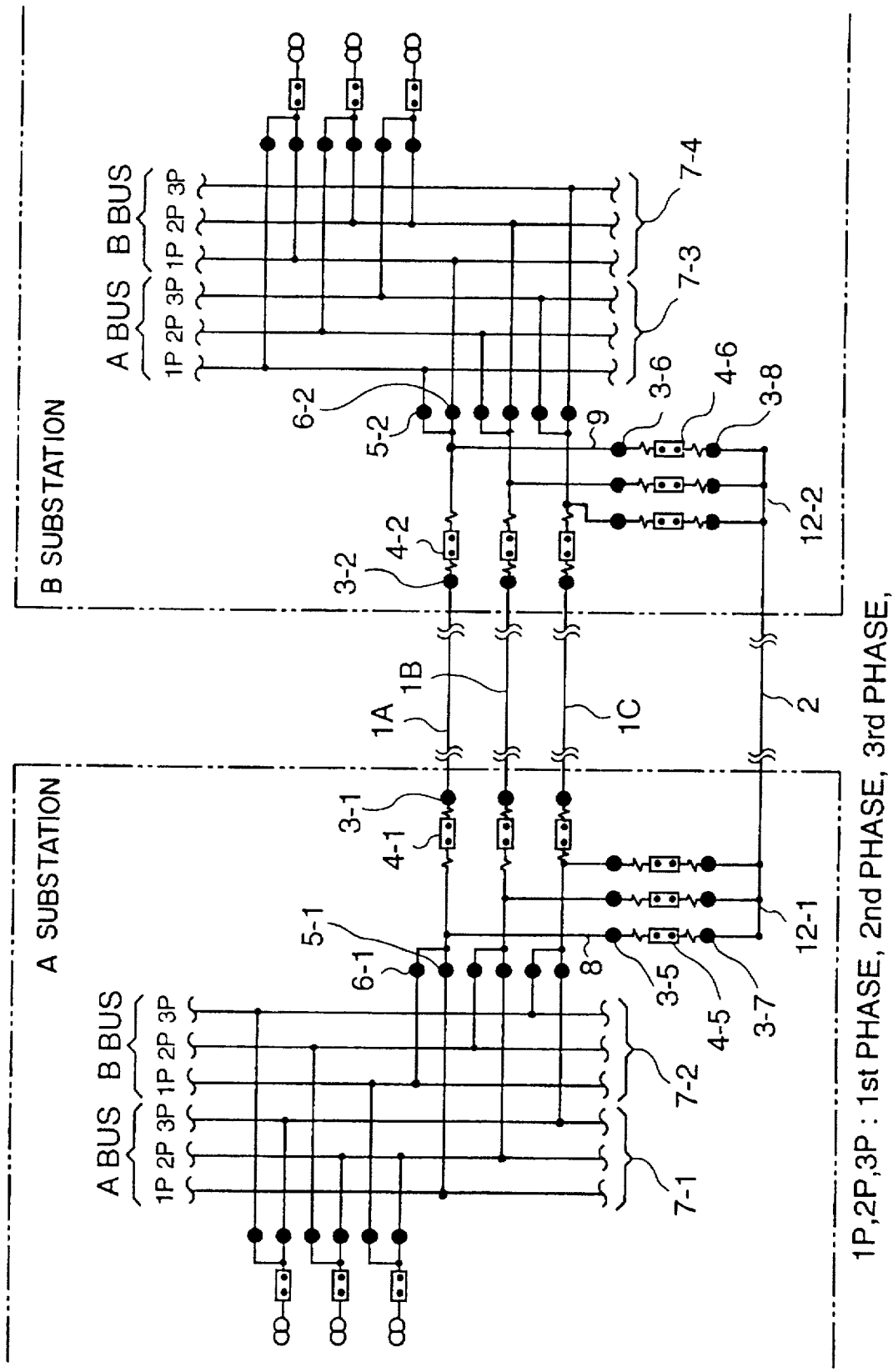
FIG. 1 shows a triple line connection diagram for an embodiment of a gas insulated power transmission system of the present invention.

FIG. 1 shows a triple line connection diagram for an embodiment of a gas insulated power transmission system. Both sides of a channel of transmission lines 1A–1C are connected to gas insulated switch gears of an A substation and a B substation, respectively. The composition of the A substation is the same as the composition of the B substation, and only the composition of the A substation is explained in the following. Each of disconnectors 3-1 at the side of the channel of transmission lines and each of breakers 4-1 are connected to one of the gas insulated transmission lines 1A–1C, in order, and the breakers 4-1 are connected to an A bus and a B bus via disconnectors for the A and B buses, respectively. The gas insulated transmission lines 1 and the gas insulated switchgear are contained in metal containers, each of which is filled up with insulation gas, for example, $SF_6$ gas.

In the A substation, one of disconnectors 3-5, one of breakers 4-5 and one of disconnectors 3-7 in a standby gas insulated switchgear for a phase, are connected to a corresponding line of the gas insulated transmission lines branched by a three phase common enclosed branch bus 8 provided between the breakers 4-1 and the disconnectors 5-1 for the A bus and 6-1 for the B bus, and three gas insulated transmission lines connected to the disconnectors 3-7 in the standby gas insulated switchgear for a phase are combined into one gas insulated transmission line 2 by a three phase common enclosed branch bus 12-1.

Figure 2:
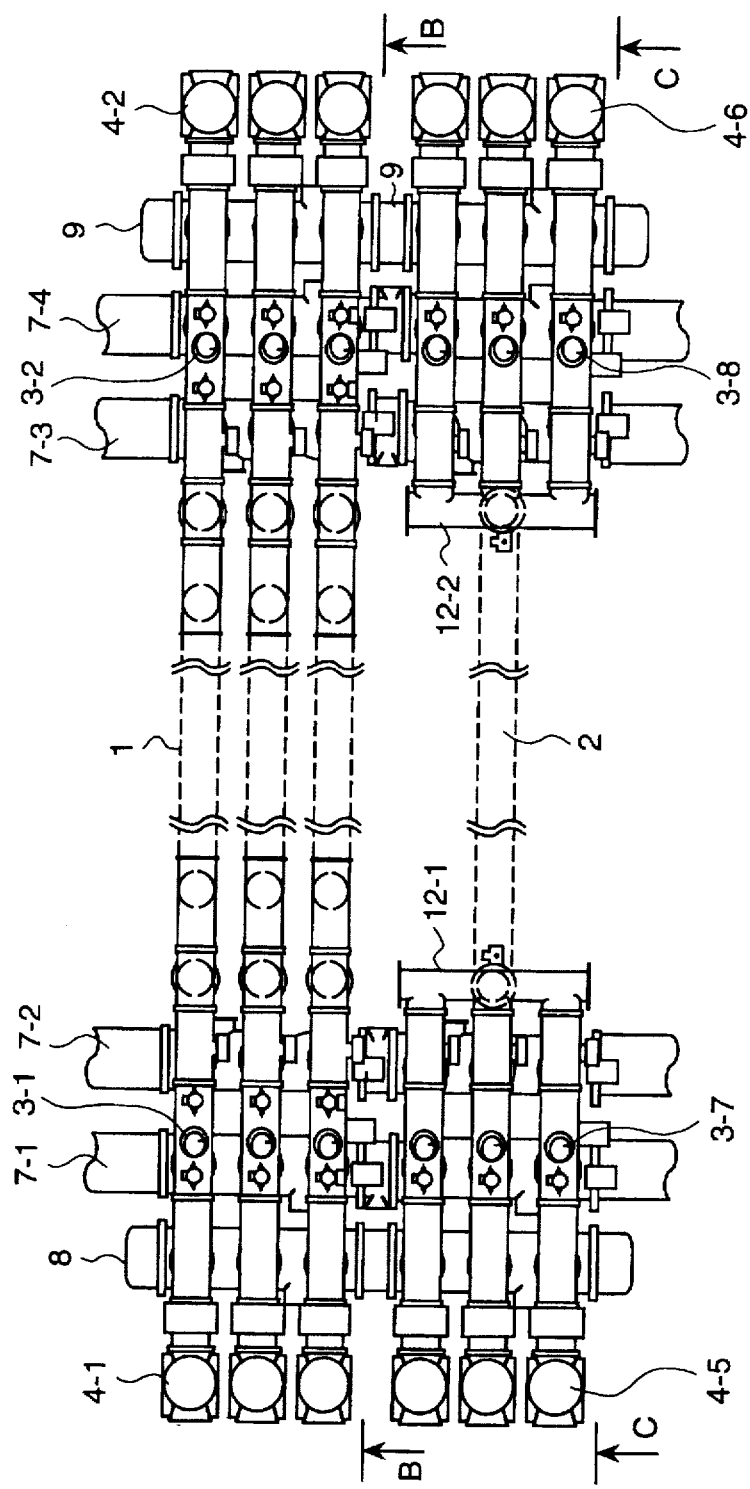
FIG. 2 is a plan view of a gas insulated switchgear used in the embodiment shown in FIG. 1.
Figure 3:
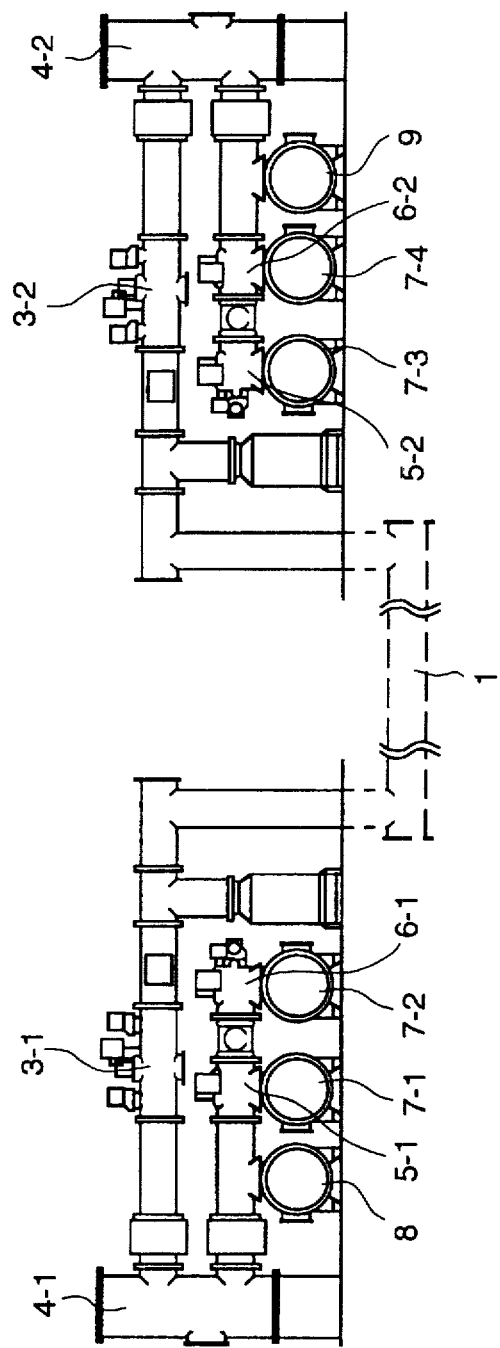
FIG. 3 is an elevation view of the gas insulated switchgear shown in FIG. 2, viewed from a line B—B.

As shown in FIGS. 2 and 3, the gas insulated transmission lines 1 are laid under the ground, and each of the gas insulated transmission lines is connected to the upper part of one of the vertical type breakers 4-1 via a corresponding one of the horizontally arranged disconnectors 3-1, after being vertically raised from the under-ground. Each of the horizontally arranged disconnectors 5-1 for the A bus and each of the horizontally disconnectors 6-1 for the B bus are connected to the lower part of one of the vertical type breakers 4-1, and the A bus and the B bus which extend in the direction perpendicular to each of the branch buses, and are arranged under the disconnectors 5-1 and 6-1, are connected to each of the disconnectors 5-1 and 6-1. The three phase common enclosed branch bus 8 is arranged under branch buses provided between the breakers 4-1 and the disconnectors 5-1, so as to extend in the direction perpendicular to the gas insulated transmission lines 1. Over the three phase common enclosed branch bus 8, single phase type branch buses are provided, and each of the single phase type branch buses is connected to the three phase common enclosed branch bus 8 in T character shape.

Figure 4:
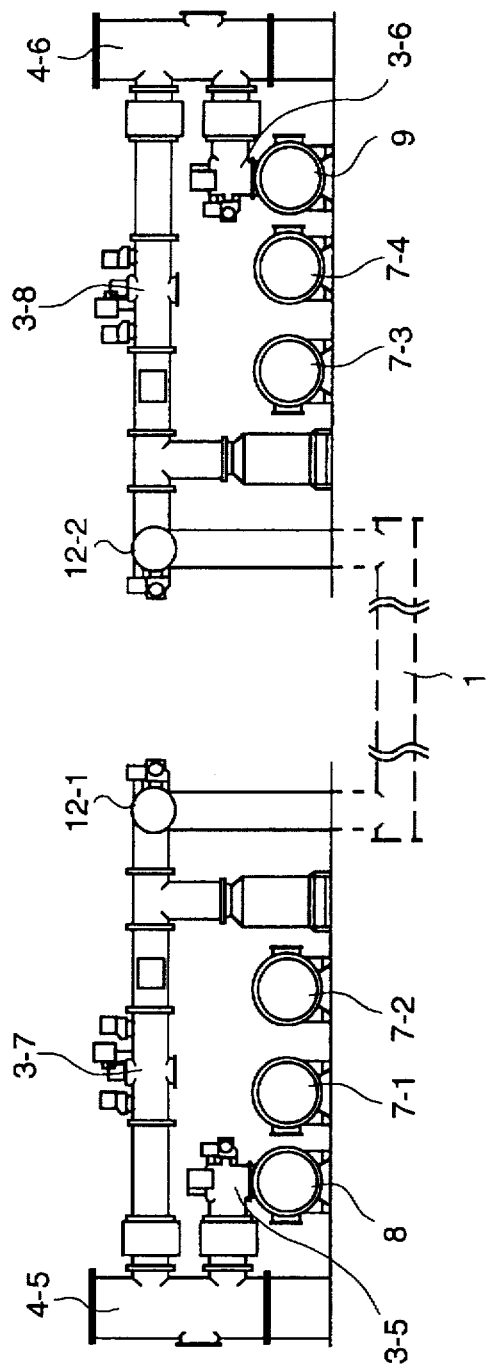
FIG. 4 is an elevation view of the gas insulated switchgear shown in FIG. 2, viewed from a line C—C.

As shown in FIG. 4, the standby gas insulated switchgear for a phase is arranged so as to extend in the direction perpendicular to the three phase common enclosed branch bus 8, at the location extended from the three phase common enclosed branch bus 8. Breakers 4-5 for the standby gas insulated switchgear for a phase are arranged neighboring to the breakers 4-1, and disconnectors 3-5 for the standby gas insulated switchgear for a phase are arranged over the three phase common enclosed branch bus 8. Each of the disconnectors 3-5 for the standby gas insulated switchgear for a phase is connected to the lower part of a corresponding one of the breakers 4-5 and the three phase common enclosed bus 8. A line connected to each of the disconnectors is branched at the upper part of a corresponding one of the breakers 4-5, and connected to one of disconnectors 3-7. Each of three lines from the disconnectors 3-7 are branched downward at the branch bus 12-1 for three phases, and the three lines are combined into one line at a lower position. The combined line is further extended downward and connected to the standby gas insulated transmission line 2. A standby gas insulated switchgear for a phase of the B substation to which the standby gas insulated transmission line 2 is connected, has the same composition as the standby switchgear for a phase of the A substation.

Further, protection relays, as shown in FIG. 1 by the zigzag characters, before and after each of the breakers 4-1, 4-2, 4-4, and 4-6 are provided at the transmission lines, and if a failure occurs at one of the transmission lines, a gas insulated transmission line for the failed phase is disconnected from the power transmission system by opening the breaker of the transmission line, based on a failure detection signal from one of the protection relays. After opening the breaker of the transmission line for the failed phase, the breakers 4-5 and 4-6 in the standby gas insulated switchgears of the both substations are closed.

As mentioned above, this embodiment constitutes such a power transmission system whereby a transmission line for the failed phase can be switched to the standby transmission line, based on a failure detection signal from one of the protection relays, by providing a standby gas insulated switchgear for a phase having a transmission line unit which includes three sets of breakers and disconnectors for three phases, each set being connected to each of the ordinary channel of transmission lines for three phases, and by providing a protection relay at each of the ordinary transmission lines. Hitherto, opening a breaker was conducted manually by hand. On the other hand, in this embodiment, since opening a breaker is automatically controlled, based on a failure detection signal from one of the protection relays, power transmission can be more quickly recovered even if a failure occurs at one of the transmission lines. Furthermore, since two switchgears for the ordinary channel of three transmission lines for three phases and the standby transmission line for a phase are provided, and one line of the standby switchgear can be connected to any one of the ordinary channel of three transmission lines, six lines for six phases of the existing power transmission lines can be reduced to four lines for four phases. The economical effect of the present invention therefore is large, especially for long distance power transmission. Further, the reduction of the line number also decreases the dimension of a tunnel, which decreases the man-hours of installing and maintaining a power transmission system.

In this embodiment, although the power transmission system of the present invention is used for a transmission between substations, the present invention is also applicable to a power transmission between a substation and a power plant.

Figure 5:
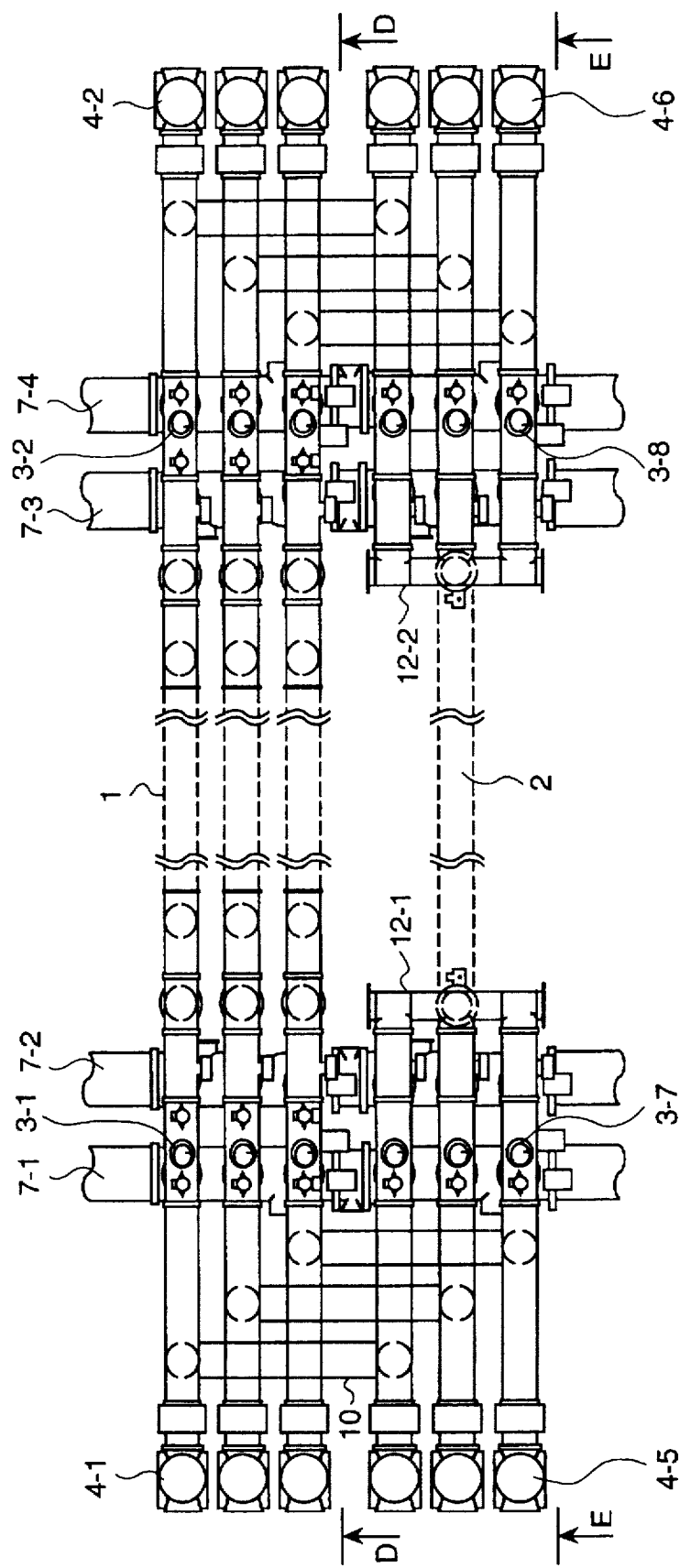
FIG. 5 is a plan view of a gas insulated switchgear used in another embodiment of a gas insulated power transmission system of the present invention.
Figure 6:
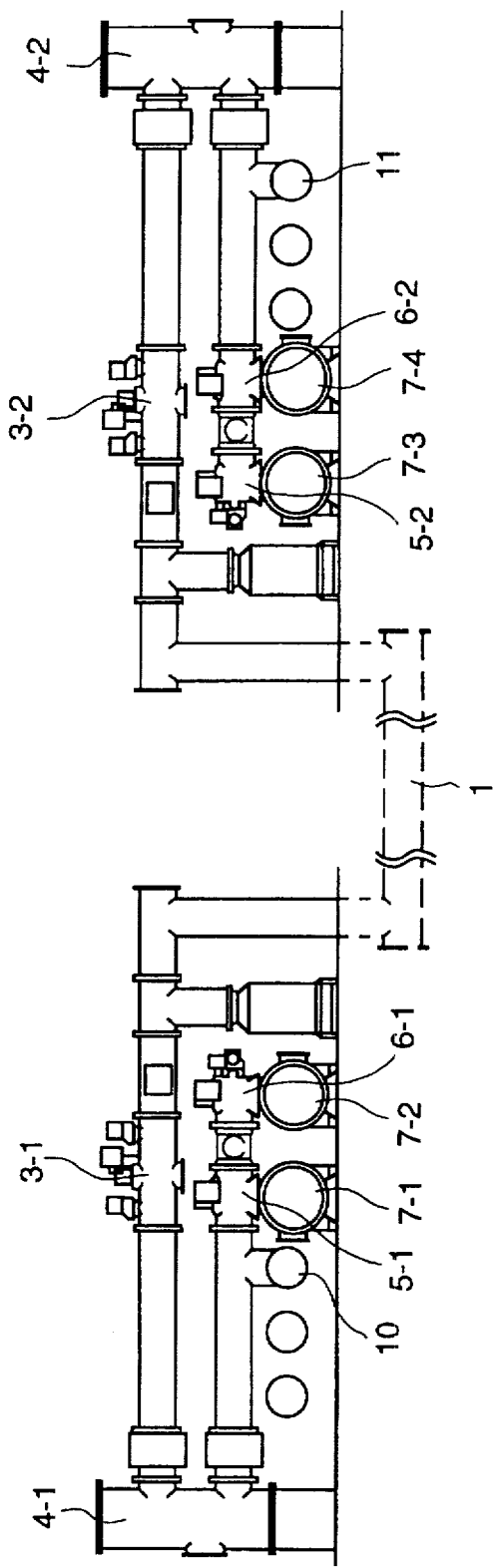
FIG. 6 is an elevation view of the gas insulated switchgear shown in FIG. 5, viewed from a line D—D.
Figure 7:
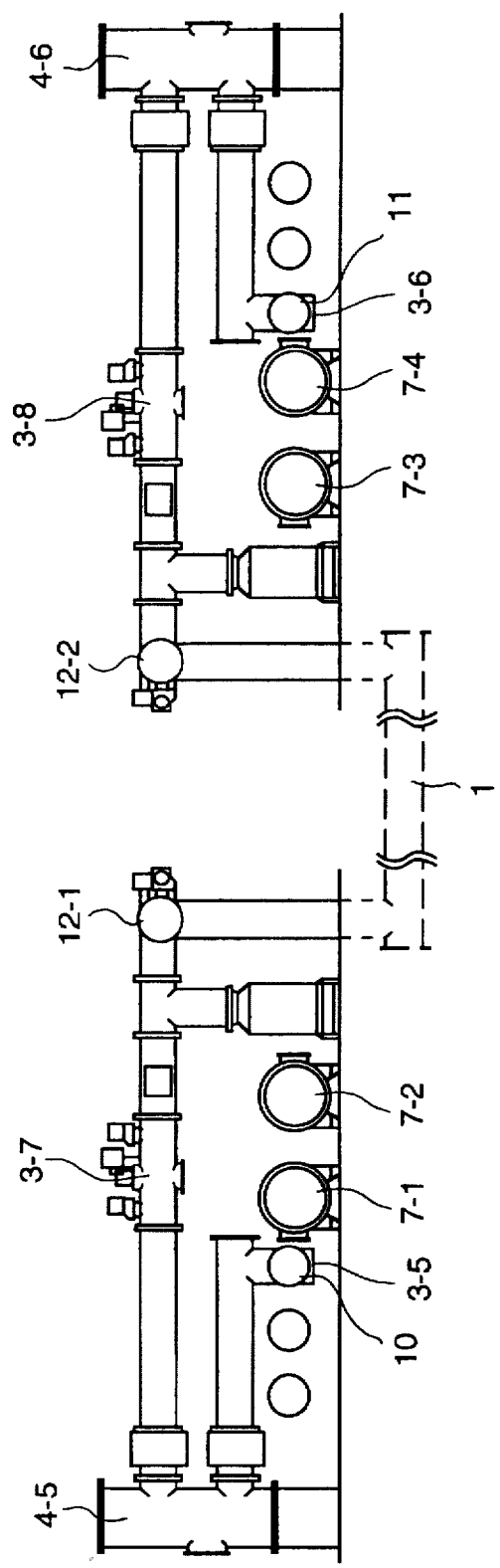
FIG. 7 is an elevation view of the gas insulated switchgear shown in FIG. 5, viewed from a line E—E.
Figure 8:
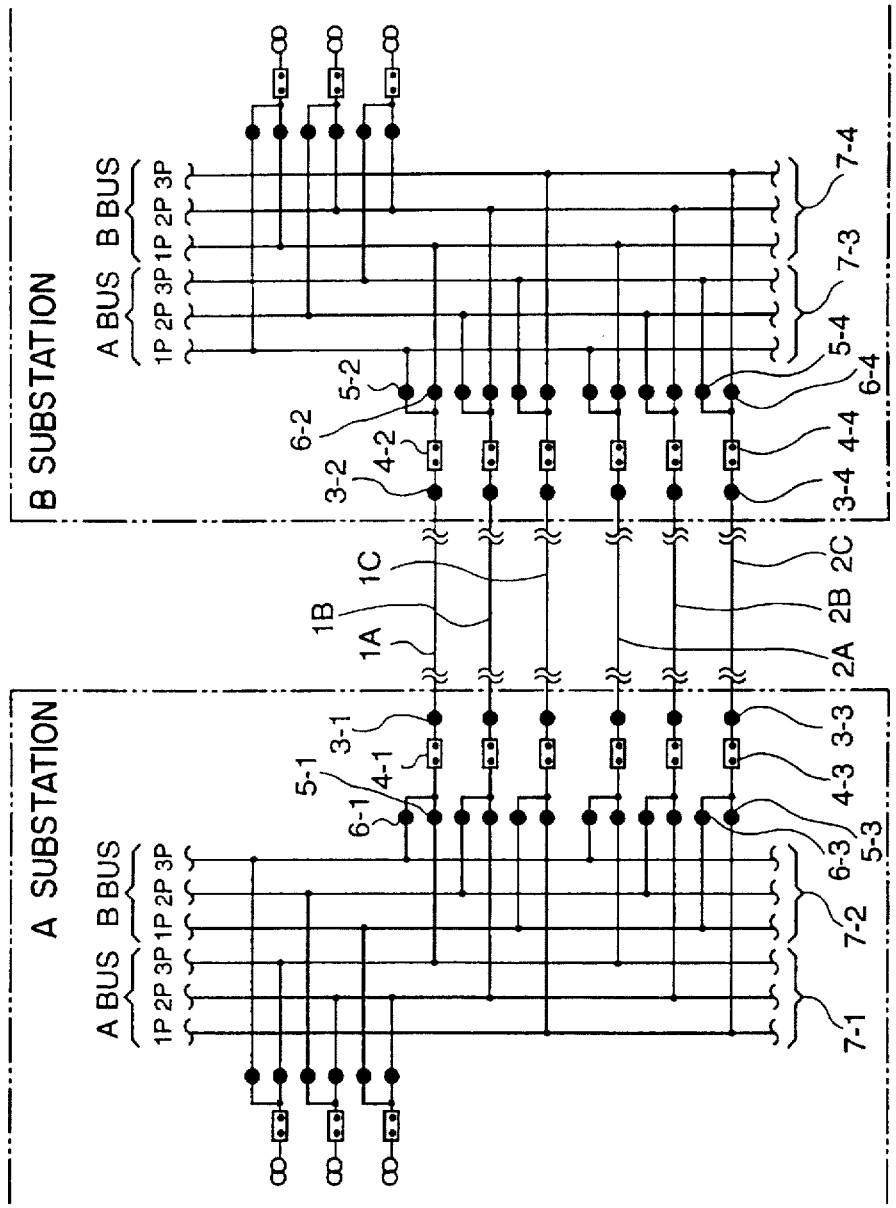
FIG. 8 shows a triple line connection diagram for an existing gas insulated power transmission system.
Figure 9:
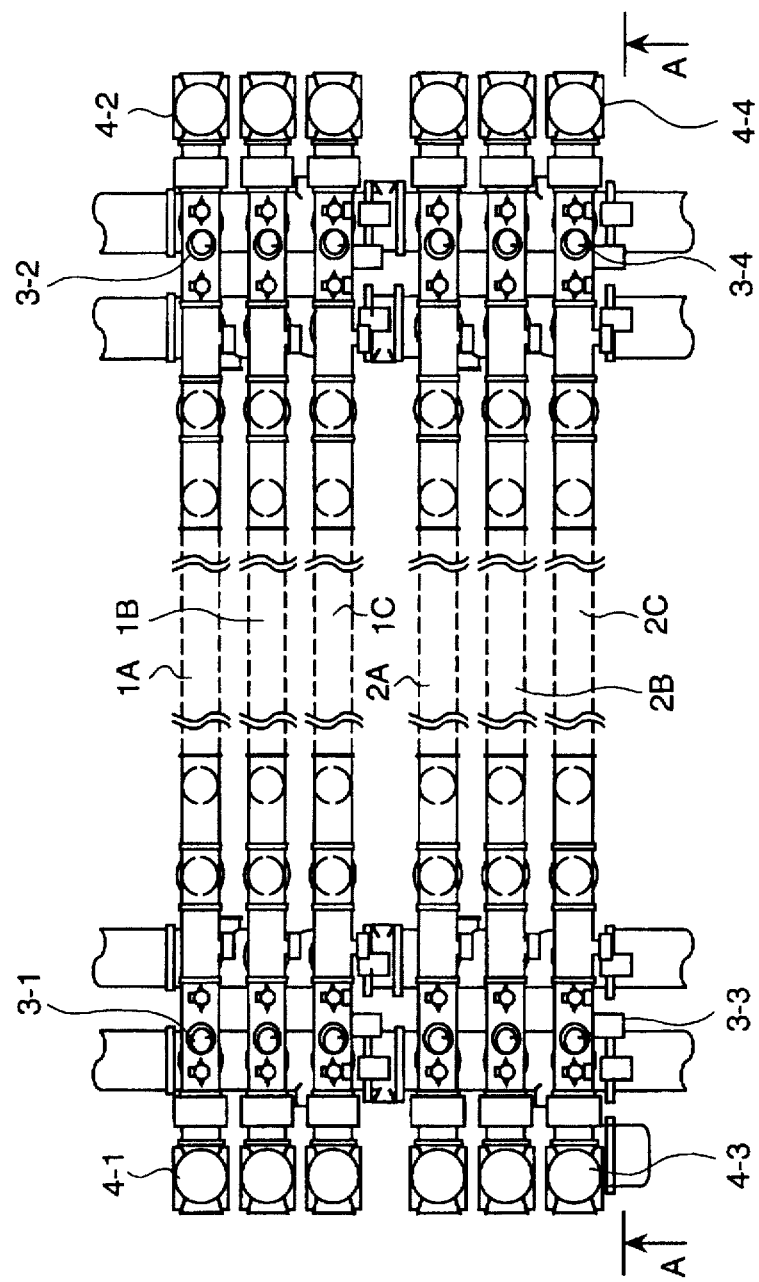
FIG. 9 is a plan view of a gas insulated switchgear used in the existing gas insulated power transmission system shown in FIG. 8.
Figure 10:
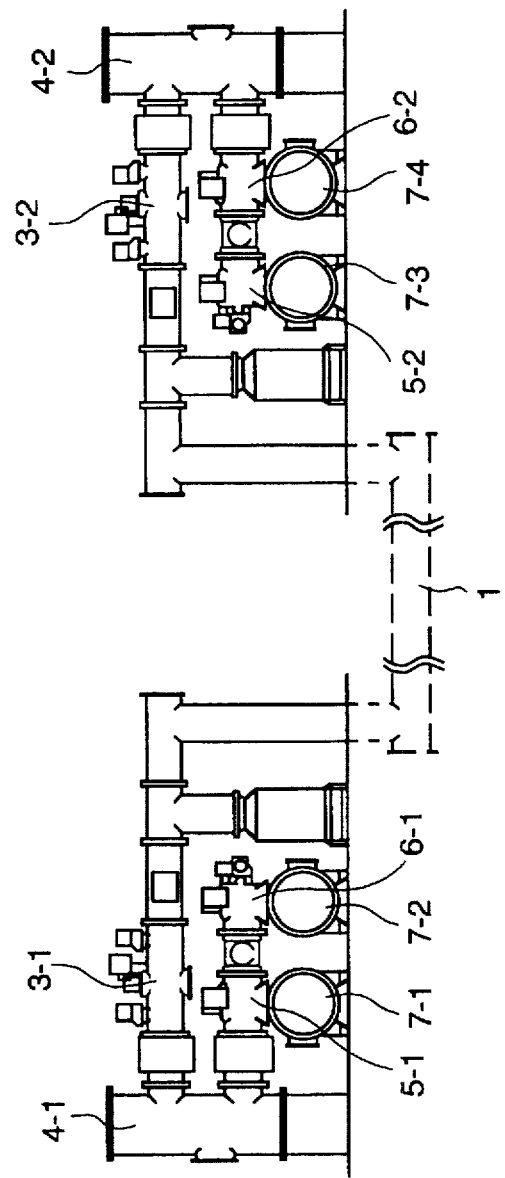
FIG. 10 is an elevation view of the gas insulated switchgear shown in FIG. 9, viewed from a line A—A.

Another embodiment of the present invention is explained, by referring to FIGS. 5–7. As shown in FIG. 5, three lines for three phases of the gas insulated switchgear are connected to the ordinary channel 1 of three transmission lines by three single phase connected buses 10, respectively, in place of the three phase common enclosed branch bus 8. Further, each of the three single phase connected buses 10 in the A substation ( each of three single phase connected buses 11 in the B substation), is connected to a line of the ordinary channel 1 of transmission lines for three phase and to a corresponding line of the standby power transmission line unit so that each interval between the line of the ordinary channel and the corresponding line of the standby power transmission line unit is the same length, for three phases. The single phase connected buses 10 and 11 are provided under branch buses for the A bus and the B bus, and each of the single connected buses 10 in the A substation ( 11 in the B station ) is connected to a corresponding line of the standby power transmission line unit in T character shape.

In this embodiment, since two switchgears for the ordinary channel of three transmission lines for three phases and the standby transmission line for a phase are provided, and one line of the standby switchgear can be connected to any one of the ordinary channel of three transmission lines, six lines for six phases of the existing power transmission lines can be reduced to four lines for four phases. The economical effect of the present invention therefore is large, especially for long distance power transmission. Further, the reduction of the line number also decreases the dimension of a tunnel, which decreases the man-hours of installing and maintaining a power transmission system. Further, although the length of each single phase connected branch bus becomes longer in comparison with the previous embodiment, the whole height of the switchgears in the substation can be reduced, since the disconnectors 3-5 of the standby gas insulated switchgear for a phase can be provided at the single phase connected parts.

What is claimed is:

1. A power transmission system having gas insulated transmission lines for connecting two stations of substations/switching stations, and a gas insulated switchgear installed in each of said two stations and connected to said gas insulated transmission lines, said transmission system comprising:

a channel of gas insulated transmission lines for three phases;

a standby channel of a gas insulated transmission line for one phase;

a transmission line unit in a gas switchgear including three sets of breakers and disconnectors for three phases, provided for said channel of gas insulated transmission lines for three phases; and a standby transmission line unit in a standby gas switchgear, including three sets of breakers and disconnectors for three phases, provided for said standby channel of a gas insulated transmission line for a phase;

wherein three lines for three phases branched from three lines connected to said channel of gas insulated transmission lines for three phases, by using a branch bus, are combined into one line and connected to said standby channel via said standby transmission unit.

2. A power transmission system according to claim 1, further including protection relays provided at said channel of gas insulated transmission lines, wherein the opening operation of a breaker, corresponding to a failed phase in the channel, in said transmission line unit of the channel of gas insulated transmission lines for three phases is controlled, based on a failure detection signal for said failed phase sent from one of said protection relays, and the closing operation of a breaker, corresponding to said failed phase, in said transmission line unit of said standby channel of a gas insulated transmission line, is also controlled, based on said failure detection signal for said failed phase sent from said one of said protection relays.

3. A power transmission system according to claim 1, wherein said branch bus comprises a three phase common enclosed bus.

4. A power transmission system according to claim 1, wherein said branch bus comprises three pieces of single phase connected buses.

5. A power transmission system according to claim 4, wherein each of said disconnectors of said transmission line unit for said standby channel for a phase is provided at the same location as each of said single phase connected buses.

6. A power transmission system according to claim 1, wherein said channel of transmission lines for three phases are connected to main buses via said disconnectors provided at a side of said main buses, and said branch bus is provided between said disconnectors provided at said side of said main buses and said main buses.

7. A gas insulated switchgear installed in each of substations/switching stations and connected to gas insulated transmission lines for connecting two stations of said substations/said switching stations, said gas insulated switchgear comprising:

a first transmission line unit including three sets, each set including one breaker and disconnectors, for three phases, provided in a channel of gas insulated transmission lines for three phases; and a second transmission line unit including three sets, each set including one breaker and disconnectors for, three phases, provided in a standby channel of a gas insulated transmission line for a phase;

wherein said first and second transmission line units are connected to each other by using a branch bus, and a transmission line corresponding to a failed phase in said channel of gas insulation lines for three phases is switched to said standby channel of a gas insulated transmission line for a phase, via said second transmission line unit in each of said two stations.

8. A gas insulated switchgear according to claim 7, wherein said branch bus in said second transmission line unit is a three phase common enclosed bus.

9. A gas insulated switchgear according to claim 7, wherein said branch bus in said second transmission line unit comprises three pieces of single phase connected buses.

* * * * *